United States Patent
Tang et al.

(10) Patent No.: US 9,959,258 B2
(45) Date of Patent: May 1, 2018

(54) GENERATING CHARACTERISTICS OF USERS OF AN ONLINE SYSTEM PRESENTED WITH CONTENT IN A CONTEXT RELATIVE TO OTHER CONTENT

(71) Applicant: Facebook, Inc., Menlo Park, CA (US)

(72) Inventors: Junbiao Tang, Mercer Island, WA (US); Ewa Dominowska, Kirkland, WA (US); Hua Chen, Redmond, WA (US); Jennifer Anne Abrahamson, Seattle, WA (US); Abhishek Agarwal, London (GB)

(73) Assignee: Facebook, Inc., Menlo Park, CA (US)

( * ) Notice: Subject to any disclaimer, the term of this patent is extended or adjusted under 35 U.S.C. 154(b) by 194 days.

(21) Appl. No.: 15/136,559

(22) Filed: Apr. 22, 2016

(65) Prior Publication Data

US 2017/0308512 A1    Oct. 26, 2017

(51) Int. Cl.
*G06F 17/22* (2006.01)
*H04L 29/08* (2006.01)

(52) U.S. Cl.
CPC .......... *G06F 17/2247* (2013.01); *H04L 67/02* (2013.01); *H04L 67/20* (2013.01); *H04L 67/306* (2013.01)

(58) Field of Classification Search
CPC ... G06F 17/2247; H04L 67/20; H04L 67/306; H04L 67/02
See application file for complete search history.

(56) References Cited

U.S. PATENT DOCUMENTS

| | | | | |
|---|---|---|---|---|
| 8,762,496 | B1* | 6/2014 | Kiveris | G06Q 30/0251 709/203 |
| 9,553,939 | B2* | 1/2017 | Yu | H04L 67/22 |
| 9,641,972 | B1* | 5/2017 | Hughes | H04W 4/021 |
| 9,697,287 | B2* | 7/2017 | Doan | G06F 17/30864 |
| 2008/0147633 | A1* | 6/2008 | Chandley | G06F 17/30867 |
| 2008/0249987 | A1* | 10/2008 | Ogasawara | G06F 17/30867 |
| 2012/0054666 | A1* | 3/2012 | Baird-Smith | G06Q 10/10 715/780 |
| 2012/0239489 | A1* | 9/2012 | Peretti | G06Q 30/02 705/14.45 |
| 2014/0208424 | A1* | 7/2014 | Hudack | G06F 21/316 726/23 |
| 2015/0095355 | A1* | 4/2015 | Patton | G06F 17/30241 707/754 |
| 2017/0024777 | A1* | 1/2017 | Rajwat | G06Q 30/0275 |

* cited by examiner

*Primary Examiner* — Maikhanh Nguyen
(74) *Attorney, Agent, or Firm* — Fenwick & West LLP (57) ABSTRACT

An online system maintains information identify a context in which sponsored content items were presented to users. A context in which a sponsored content item was presented to a user identifies additional content presented to the user prior to the sponsored content item, and may identify additional content presented in conjunction with the sponsored content item. The online system identifies users to whom at least one sponsored content item was presented in a context and generates characteristics for the context based on characteristics of users who were presented with at least one sponsored content item in the context. When the online system receives a request to present sponsored content items in the context that does not identify an online system user, the online system selects sponsored content items for the request based on the generated characteristics for the context.

18 Claims, 2 Drawing Sheets

GENERATING CHARACTERISTICS OF USERS OF AN ONLINE SYSTEM PRESENTED WITH CONTENT IN A CONTEXT RELATIVE TO OTHER CONTENT

BACKGROUND

This invention relates generally to selecting content for presentation to users, and more specifically to selecting content for presentation in specific contexts relative to other presented content.

Various online systems provide content to client devices for presentation to online system users via one or more networks. An online system may select content for presentation to a user based on information about the user maintained by the online system. For example, an online system allows a user to establish connections between other users and to provide content to the online system, which provides the content to the other users connected to the user. The increasing popularity of online systems, and the significant amount of user-specific information maintained by online systems, allow users of an online system allows to easily communicate information about themselves to other users and share content with other users.

Additionally, entities may sponsor presentation of content items via an online system to gain public attention for the entity's products or services, or to persuade online system users to take an action regarding the entity's products or services. Many online systems receive compensation from an entity for presenting online system users with certain types of sponsored content items provided by the entity. Frequently, online systems charge an entity for each presentation of sponsored content to an online system user (e.g., each "impression" of the sponsored content) or for each interaction with sponsored content by an online system user (e.g., each "conversion"). For example, an online system receives compensation from an entity each time a content item provided by the entity is displayed to a user on the online system or each time a user is presented with a content item on the online system and the user interacts with the content item (e.g., requests additional content by interacting with the content item).

An online system may select content for presentation to users via the online system itself, for presentation by an application, or for presentation by a third party system other than the online system. If an application or a third party system requests content for presentation from the online system, the application or the third party system may provide information to the online system identifying a user of the online system to whom the application or the third party system presents the content. Based on the information identifying the user of the online system, the online system selects content for the user based on characteristics of the user maintained by the online system. However, when an application or a third party system requests content from the online system, the online system may be unable to identify an online system user to whom the application or the third party system is to present content. If the online system is unable to identify an online system user to whom the third party system or the application is presenting content, content the online system selects for presentation by the third party system or by the application may be less likely to be of interest to a user accessing the third party system or accessing the application, reducing interaction with content provided by the online system and reducing potential revenue to the online system.

SUMMARY

An online system maintains multiple content items for presentation to users. Some of the content items may include bid amounts, with a bid amount included in a content item specifying an amount of compensation received by the online system from an entity associated with the content item in exchange for presenting the content items to one or more users. The online system presents content items to users via the online system and also receives requests from third party systems for content to be presented by the third party system. When the online system receives a request from a third party system or from an application for content the online system selects a content item maintained by the online system and communicates the selected content item to the third party system or to the application for presentation.

As content items are presented by the online system, by one or more applications, or by one or more third party systems, the online system maintains information describing contexts in which the content items are presented to various users relative to other content presented to the users of the online system. The context in which a content item is presented identifies other content presented before presentation of the content item, and may also identify content presented in conjunction with the content item or describe characteristics of a device or an application presenting the content item. In various embodiments, the context in which an application is presented may be determined based on content identified in a request for content received from an application or from a third party system or may be determined from information received from the application or from the third party system after the online system provides one or more content items to the application or to the third party system. Information maintained by the online system identifying a context in which an content item was presented to a user by an application includes information identifying the user to the online system, information identifying the application, and information describing additional content presented to the user via the application prior to presentation of the content item. The stored information may also identify additional content presented by the application in conjunction with the content item. As an example, the context in which the content item was presented identifies other content items presented by the application before presentation of the content item or identifies content generated by the application and presented to a user within a threshold time prior to presentation of the content item. In various embodiments, the application communicates identifiers of content presented to the user and times associated with each identifier corresponding to times when content corresponding to each identifier was presented to the user. In some embodiments, information describing the context in which the content item was presented relative to other context may also include information associated with the user by the application.

Content items may also be presented to online system users via one or more web pages provided by a third party system, with an application executing on a client device presenting the web pages to an online system user. The application presenting the web pages from the third party system or the third party system provides the online system with information identifying a user of the online system and identifying other content from the third party system presented to the user prior to presentation of the content item to the user. For example, identifiers of web pages presented to the user by the third party system within a threshold time interval of presentation of the content item are provided to the online system by the third party system. The online system maintains information identifying a context in which an content item was presented to a user via a web page from a third party system, identifying additional content provided to the user by the third party system before the content item and optionally identifying additional content presented to the user in conjunction with the content item. Hence, the context in which the content item is presented by a web page identifies additional web pages presented to the user prior to presentation of the content item on the web page. Additionally, the context in which the content item is presented by a web page may include additional content (e.g., images, text) presented on the web page along with the content item and a position of the content item in the web page relative to other content on the web page. In some embodiments, the context in which the application is presented by a web page includes information identifying a type of client device on which the web page including the content item was presented (e.g., a device model or type) or an identifier of an application that presented the web page including the content item (e.g., an application identifier).

To improve selection of content items when requests for content from an application or from a third party system do not include information identifying a user of the online system, the online system determines characteristics of users who are presented with content items in different contexts relative to other content. The online system selects a context in which one or more content items were presented and identifies users to whom one or more content items were presented in the selected context relative to other content from the maintained information. In some embodiments, a third party system or an application providing an ad request to the online system specifies the context in which one or more content items are presented relative to other context, and the online system selects the specified context in which one or more content items were presented relative to other content. Alternatively, the online system selects the context in which one or more content items were presented relative to other content based on criteria maintained by the online system.

Based on the maintained information, the online system identifies users of the online system to whom at least one content item was presented in the selected context relative to other content. As the maintained information includes information identifying users of the online system, the online system selects maintained information including the selected context relative to other content and retrieves information identifying users of the online system from the selected information. Information identifying users of the online system may be user identifiers associated with various users by the online system to uniquely identify different users, or other information allowing the online system to uniquely identify different users to whom one or more content items were presented in the selected context relative to other content.

The online system obtains characteristics of each of the identified users to whom one or more content items were presented in the selected context relative to other content from information associated with the identified users by the online system. Characteristics of an identified user include actions performed by the identified user and identified to the online system (e.g., sharing content items with other users of the online system, expressing preferences for content items, commenting on content items, purchases made, etc.), connections between the identified user and other users of the online system, and demographic information associated with the identified user by the online system (e.g., age range, location, interests, education history, job history, gender, etc.). In various embodiments, characteristics of an identified user include information about the identified provided to the online system by an application, by a client device, by a third party system, or by any other suitable source.

From the obtained characteristics of the identified users, the online system generates characteristics of users who were presented with at least one content item in the selected context relative to other content. In some embodiments, the online system generates the characteristics of users who were presented with at least one content item in the selected context relative to other content as obtained characteristics common to at least a threshold number of the identified users. In other embodiments, the online system generates the characteristics of users who were presented with at least one content item in the selected context relative to other content as obtained characteristics common to at least a threshold percentage of the identified users. However, the online system may generate characteristics of the identified users who were presented with at least one content item in the selected context from the obtained characteristics of the identified users via any suitable method in various embodiments. The online system stores the generated characteristics in association with the selected context, allowing the online system to maintain characteristics of users to whom content items were presented in the selected context. In some embodiments, if less than a minimum number or if less than a minimum percentage of obtained characteristics are common to at least the threshold number or to at least the threshold percentage of the identified users, the online system does not generate characteristics of users who were presented with at least one content item in the selected context relative to other content.

After storing the generated characteristics in association with the selected context, if the online system receives a request to provide one or more content items to a client device for presentation and is unable to identify a user of the online system identified by the request, the online system receives the generated characteristics associated with the selected context. For example, if the request does not include a user identifier associated with a user by the online system, the online system retrieves the generated characteristics associated with the selected context. As another example, if the request includes a client device identifier that the online system has not associated with a user identifier, the online system retrieves the generated characteristics associated with the selected context. The online system includes content items having at least a threshold number of targeting criteria satisfied by the generated characteristics associated with the selected context in one or more selection processes. Using the generated characteristics associated with the selected context allows the online system to select from content items presented to other users who were presented with one or more content items in the selected context, which increases a likelihood of an content item communicated to the client device for presentation being of interest to a user of the client device or increases a likelihood the user of the client device interacting with an content item selected in response to the received request. This may increase overall interactions with content items presented in the selected context, increasing revenue to the online system and information received by the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
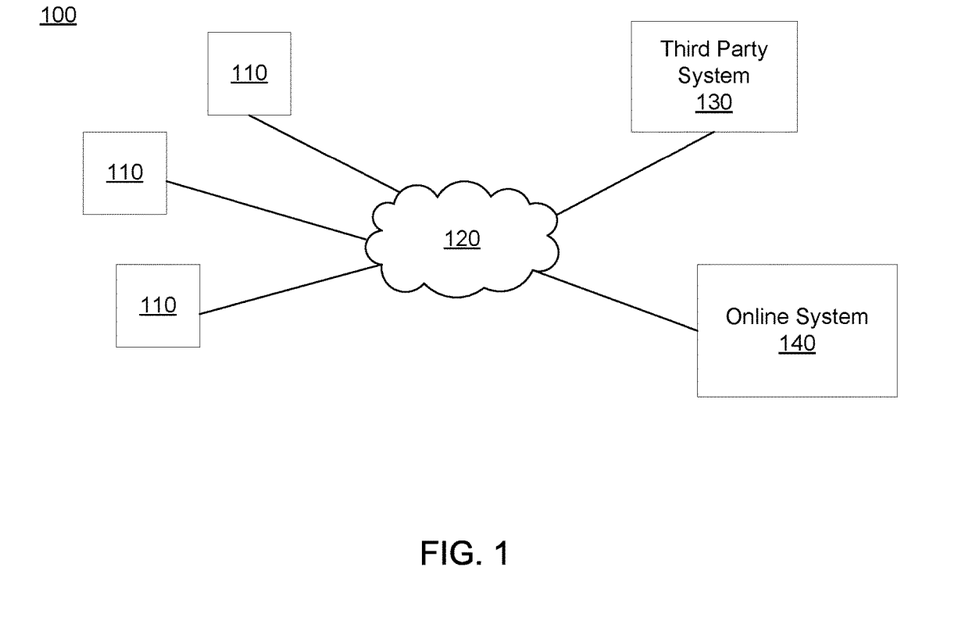
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ether net, 802.11, worldwide inter operability for microwave access (WIMP), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
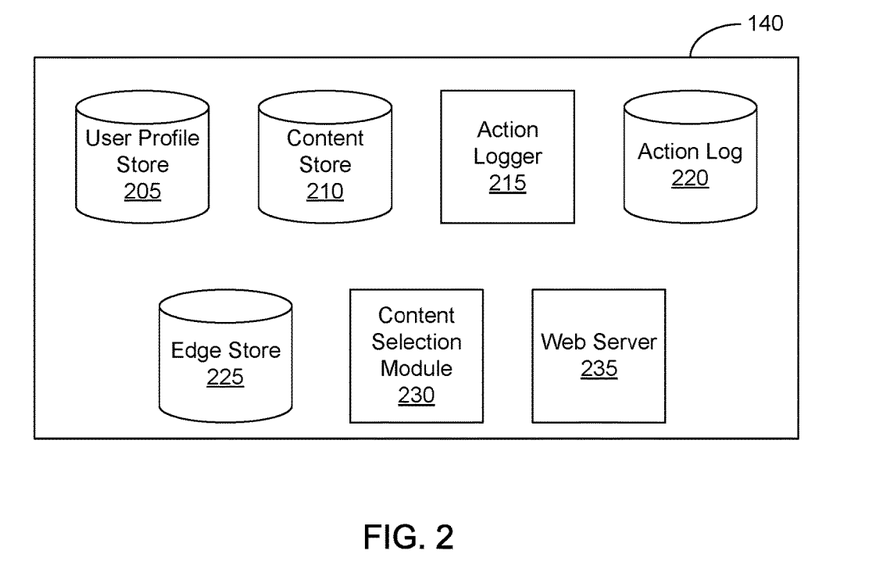
FIG. 2 is a block diagram of an online system, in accordance with an embodiment.

FIG. 2 is a block diagram of architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also includes a landing page specifying a network address to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

In various embodiments, the content store 210 also stores information associated with various content items identifying contexts in which content items were presented to users and identifying online system users to whom content items were presented. The context in which a content item is presented identifies other content presented prior to presentation of the content item, and may also identify content presented in conjunction with the content item or describe characteristics of a client device 110 or an application presenting the content item. In various embodiments, the context in which a content item is presented may be determined based on content identified in a request for content received from an application or from a third party system 130 or may be determined from information received from the application or from the third party system 130 after the online system 140 provides one or more content items to the application or to the third party system 130.

Information associated with a content item identifying a context in which the content item was presented to a user by an application includes information identifying the user to the online system 140, information identifying the application, and information describing additional content presented to the user via the application prior to presentation of the content item. The stored information may also identify additional content presented by the application in conjunction with the content item. Additionally, the context in which a content item was presented to a user may identify information associated with the user by the application, interactions with the application by the user prior to presentation of the content item, inputs provided to the application by the user prior to presentation of the content item, or any other suitable information. Content items may also be presented to online system users via one or more web pages provided by a third party system 130, with an application executing on a client device 110 presenting the web pages to an online system user. For a content item presented by a third party system 130, the context in which the content item was presented stored by the content store 210 identifies additional content provided to the user by the third party system 130 prior to the content item (e.g., web pages) and optionally identifying additional content presented to the user in conjunction with the content item (e.g., images, video, or text included on the web page including the content item). Information describing a context in which a content item was presented to a user relative to other context is further described below in conjunction with FIG. 3.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, content items that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various ad requests (or other content items) based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The content selection module 230 selects content for presentation by one or more third party systems 130 in various embodiments. For example, the content selection module 230 receives requests from third party systems 130 for content items to be presented by the third party systems 130. When the content selection module 230 receives a request from a third party system 130 for content, the content selection module 230 selects one or more content items from the content store 210 based on the bid amounts of the content items and communicates the selected one or more content items to the third party system 130 for presentation.

To provide content items to applications or third party systems 130 with which users are more likely to interact, the content selection module 230 generates characteristics of online system users who were presented with content items in different contexts relative to other content presented to the users. As further described below in conjunction with FIG. 3, the content selection module 230 identifies users who were presented with at least one content item in various contexts and generates characteristics of users who were presented with one or more content items in each of the various contexts. In various embodiments, the content selection module 230 selects a context in which a content item was presented relative to other content and identifies users who were presented with at least one content item in the selected context from the information associated with content items in the content store 210. The content selection module 230 obtains characteristics of the identified users from the user profile store 205, the action log 220, and the edge store 225, and generates characteristics of users who were presented with at least one content item in the selected context from the obtained characteristics, as further described below in conjunction with FIG. 3. The content selection module 230 may generate characteristics for different contexts in which content items are presented relative to other context by selecting different contexts and performing the steps further described below in conjunction with FIG. 3 for the different contexts.

The content selection module 230 stores characteristics generated for a context in association with the context. Subsequently, if the content selection module 230 receives a request for content items that does not include information allowing the content selection module 230 to identify a user of the online system 140, the content selection module 230 determines a context in which the content items are to be presented corresponding to the request and retrieves the generated characteristics stored in association with the determined context. The content selection module 230 uses the generated characteristics associated with the determined context to select content items for inclusion in one or more selection processes for the request. Hence, the content selection module 230 includes content items having at least a threshold number of targeting criteria satisfied by the generated characteristics associated with the determined context in the one or more selection processes, allowing the content selection module 230 to select from content items associated with targeting criteria satisfied by characteristics of other users who were presented with content items in the determined context, increasing a likelihood of a content item relevant to a user being presented in response to the request.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
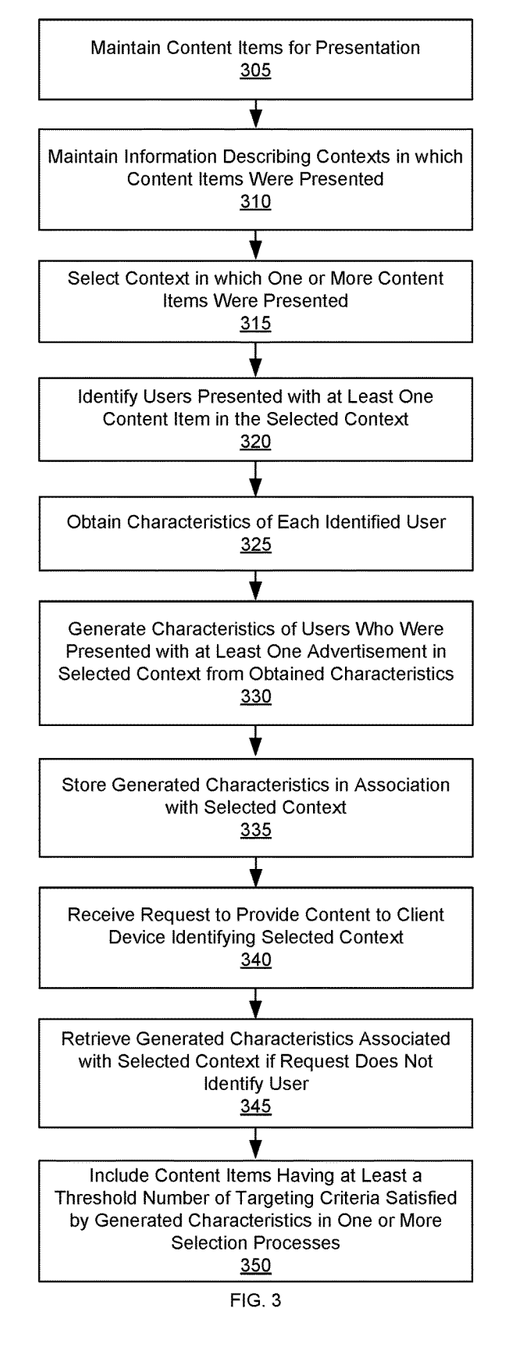
FIG. 3 is a flowchart of a method for generating characteristics of users presented with content items in different contexts relative to other content presented to the users, in accordance with an embodiment.

Generating Characteristics of Users Based on Context in which Content is Presented to the Users FIG. 3 is a flowchart of one embodiment of a method for generating characteristics of users presented with content items in different contexts relative to other content presented to the users. In some embodiments, the method may include different and or additional steps than those described in conjunction with FIG. 3. Additionally, in various embodiments, steps of the method may be performed in different orders than the order described in conjunction with FIG. 3.

An online system 140 maintains 305 multiple content items. In some embodiments, the online system 140 locally stores the content items. Alternatively, the online system 140 retrieves content items from one or more third party systems 130 or other sources. In other embodiments, the online system 140 locally stores a set of content items and obtains additional content items from one or more third party systems 130. A content item may include bid amount specifying an amount of compensation received by the online system 140 from an entity associated with the content item in exchange for presenting the content item to one or more users. The online system 140 presents content items to users via the online system 140 and also communicates content items to one or more third party systems 130 for presentation by the third party system 130. For example, the online system 140 receives a request from a third party system 130 for content, selects one or more content items maintained 305 by the online system 140, and communicates the selected content items to the third party system 130 for presentation by the third party system 130. As another example, the online system 140 receives a request for one or more content items from a client device 110, selects one or more content items and communicates the selected content items to the client device 110.

As the online system 140 presents content items maintained 305 by the online system 140 to its users, the online system 140 maintains 310 information describing contexts in which the content items are presented to various users relative to other content presented to the users of the online system 140. The context in which a content item is presented identifies other content presented prior to presentation of the content item, and may also identify content presented in conjunction with the content or describe characteristics of a client device 110 or an application presenting the content item. In various embodiments, the context in which a content item is presented may be determined based on content identified in a request for one or more content items received from an application or from a third party system 130 or may be determined from information received from the application or from the third party system 130 after the online system 140 provides one or more content items to the application or to the third party system 130. Information maintained by the online system 140 identifying a context in which a content item was presented to a user by an application includes information identifying the user to the online system 140, information identifying the application, and information describing additional content presented to the user via the application prior to presentation of the content item (i.e., a "location" of the content item within the application). For example, a context in which a content item was presented identifies a location within the application in which the content item was presented. The location of a content item within the application may identify content presented by the application prior to presentation of the content item. The stored information identifying the location of the content item within the application may also identify additional content presented by the application in conjunction with the content item. As an example, the context in which the content item was presented identifies other content items presented by the application before presentation of the content item or identifies content generated by the application and presented to a user within a threshold time prior to presentation of the content item. In various embodiments, the application communicates identifiers of content presented to the user and times associated with each identifier corresponding to times when content corresponding to each identifier was presented to the user. In some embodiments, information describing the context in which the content item was presented relative to other content may also include information associated with the user by the application, data provided to the application by the user (e.g., search terms, selections of content), or interactions with the application by the user prior to presentation of the content item (e.g., types of interactions with content presented by the application, types of input provided to the application prior to presentation of the content item). Example information associated with the user by the application includes: items associated with the user by the application, currency (virtual or actual) associated with the user by the application, functionality the application is capable of providing to the user, a length of time the user has accessed the application, a length of time the application has been installed on a client device associated with the user, content presented by the application with which the user previously interacted, and a frequency with which the user interacts with the application.

Content items may also be presented to online system users via one or more web pages provided by a third party system 130, with an application executing on a client device 110 presenting the web pages to an online system user. The application presenting the web pages from the third party system 130 or the third party system 130 provides the online system 140 with information identifying a user of the online system 140 and identifying other content from the third party system 130 presented to the user prior to presentation of the content item to the user. For example, identifiers of web pages presented to the user by the third party system 130 within a threshold time interval of presentation of the content item are provided to the online system 140 by the third party system 130. The online system 140 maintains 310 information identifying a context in which a content item was presented to a user via a web page from a third party system 130 that identifies additional content provided to the user by the third party system 130 prior to the content item and optionally identifying additional content presented to the user in conjunction with the content item. Hence, the maintained context in which the content item is presented by a web page identifies additional web pages presented to the user prior to presentation of the content item on the web page. Additionally, the context in which the content item is presented by a web page may include additional content (e.g., images, text) presented on the web page along with the content item and a position of the content item in the web page relative to other content on the web page. In some embodiments, the context in which the content item is presented by a web page includes information identifying a type of client device 110 on which the web page including the content item was presented (e.g., a device model or type)

or an identifier of an application that presented the web page including the content item (e.g., an application identifier).

To allow the online system 140 to provide content items to client devices 110 that request content from the online system 140 but do not provide the online system 140 with information identifying online system users, the online system 140 determines characteristics of users who are presented with content items in different contexts relative to other content. The online system 140 selects 315 a context in which one or more content items were presented and identifies 320 users to whom one or more content items were presented in the selected context relative to other content from the maintained information. In some embodiments, a third party system 130 providing a content item to the online system 140 specifies the context in which one or more content items are presented relative to other content, and the online system 140 selects 315 the specified context in which one or more content items were presented relative to other content. Alternatively, the online system 140 selects 315 the context in which one or more content items were presented relative to other content based on criteria maintained by the online system 140. In some embodiments, the online system 140 selects 315 each context in which one or more content items were presented relative to other context and performs the following steps for each of the contexts in which one or more content items were presented to at least one user of the online system 140.

Based on the maintained information, the online system 140 identifies 320 users of the online system 140 to whom at least one content item was presented in the selected context relative to other content. As further described above, the maintained information includes information identifying users of the online system 140, so the online system 140 selects maintained information including the selected context relative to other content and retrieves information identifying users of the online system 140 from the selected information. Information identifying users of the online system 140 may be user identifiers associated with various users by the online system 140 to uniquely identify different users, or other information allowing the online system 140 to uniquely identify different users to whom one or more content items were presented in the selected context relative to other content.

The online system 140 obtains 325 characteristics of each of the identified users to whom one or more content items were presented in the selected context relative to other content. The characteristics may be obtained 325 from information maintained by the online system 140 and associated with various users or may be obtained 325 from third party systems 130 or applications that provide information to the online system 140. Characteristics of an identified user include actions performed by the identified user and identified to the online system 140 (e.g., sharing content items with other users of the online system 140, expressing preferences for content items, commenting on content items, purchases made, etc.), connections between the identified user and other users of the online system 140, and demographic information associated with the identified user by the online system 140 (e.g., age range, location, interests, education history, job history, gender, etc.). In various embodiments, characteristics of an identified user include information about the identified provided to the online system 140 by an application, by a client device 110, by a third party system 130, or by any other suitable source. Example characteristics of an identified user provided to the online system 140 from a source include: interactions with content presented by an application, an identifier of an application presenting content to the identified user, information associated with the identified user by a third party system 130, and actions performed by the identified user and identified to the third party system 130. However, in various embodiments, any suitable information associated with identified users and maintained by the online system 140 or accessible to the online system 140 may be characteristics of the identified users.

From the obtained characteristics of the identified users, the online system 140 generates 330 characteristics of users who were presented with at least one content item in the selected context relative to other content. In some embodiments, the online system 140 generates 330 the characteristics of users who were presented with at least one content item in the selected context relative to other content as obtained characteristics common to at least a threshold number of the identified users. In other embodiments, the online system 140 generates the characteristics of users who were presented with at least one content item in the selected context relative to other content as obtained characteristics common to at least a threshold percentage of the identified users. As another example, the online system 140 generates 330 the characteristics of users who were presented with at least one content item in the selected context relative to other content based on characteristics of the identified users as further described in U.S. patent application Ser. No. 13/297,117, filed on Nov. 15, 2011, and in U.S. patent application Ser. No. 14/290,355, filed on May 29, 2014, each of which is hereby incorporated by reference in its entirety. The online system 140 stores 335 the generated characteristics in association with the selected context, allowing the online system 140 to maintain characteristics of users to whom content items were presented in the selected context. In some embodiments, if less than a minimum number or if less than a minimum percentage of obtained characteristics are common to at least the threshold number or to at least the threshold percentage of the identified users, the online system 140 does not generate characteristics of users who were presented with at least one content item in the selected context relative to other content.

After storing 335 the generated characteristics in association with the selected context, the online system 140 receives 340 a request to provide content to a client device 110 for presentation that identifies the selected context. If the request includes information capable of identifying a user to the online system 140, the online system 140 retrieves characteristics of the user maintained by the online system 140 and selects ad requests having at least a threshold number of targeting criteria satisfied by characteristics of the user for inclusion in one or more selection processes. For example, the request includes a user identifier associated with a user by the online system 140, allowing the online system 140 to retrieve characteristics of the user from the user identifier. As another example, the request includes a client device identifier corresponding to the client device 110, and the online system 140 has associated a user identifier of a user of the online system 140 with the client device identifier; hence, the online system 140 determines the user identifier corresponding to the client device identifier and retrieves characteristics of the user from the user identifier.

However, if the online system 140 is unable to identify a user associated with the request, the online system 140 retrieves 345 the generated characteristics associated with the selected context. For example, if the request does not include a user identifier associated with a user by the online system 140, the online system 140 retrieves 345 the generated characteristics associated with the selected context. As another example, if the request includes a client device identifier that the online system 140 has not associated with a user identifier, the online system 140 retrieves 345 the generated characteristics associated with the selected context. Hence, if the online system 140 is unable to identify an online system user associated with the request, the online system 140 retrieves 345 the generated characteristics associated with the selected context to increase a likelihood of the online system 140 subsequently presenting one or more content items via the client device 110 with which a user of the client device 110 is likely to interact.

If the online system 140 retrieves 345 the generated characteristics associated with the selected context, the online system 140 includes 350 content items having at least a threshold number of targeting criteria satisfied by the generated characteristics associated with the selected context in one or more selection processes. Using the generated characteristics associated with the selected context allows the online system 140 to select from content items presented to other users who were presented with one or more content items in the selected context, which increases a likelihood of an content item communicated to the client device 110 for presentation being of interest to a user of the client device 110 or increases a likelihood the user of the client device 110 interacting with a content item selected in response to the received request. Hence, the generated characteristics associated with the selected context allow the online system 140 to leverage information maintained by the online system 140 to select content items for presentation in the selected context more likely to be relevant when the online system 140 is unable to identify a user to whom one or more content items are to be presented in the selected context. This may increase overall interactions with content items presented in the selected context, which increases information received by the online system 140.

In some embodiments, bid amounts are associated with one or more of the content items maintained 305 by the online system 140. As described above, a bid amount associated with a content item specifies an amount of compensation a user associated with the content item provides the online system 140 in exchange for presenting the content item or for one or more interactions by users with the presented content item. Hence, leveraging information maintained by the online system 140 when selecting content for presentation to a user in the selected content may increase g revenue to the online system 140 from presenting content items.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining a plurality of content items at an online system for presentation to users of the online system;
maintaining information at the online system describing contexts in which the content items are presented to users of the online system identified by the online system relative to other content presented to the users of the online system;
selecting a context in which one or more content items are presented relative to other content;
identifying users of the online system to whom one or more content items were presented in the selected context relative to other content from the information maintained at the online system;
obtaining characteristics of each of the identified users based information associated with the identified users by the online system;
generating characteristics of users presented with one or more content items in the selected context from the obtained characteristics;
storing the generated characteristics in association with the selected context;
receiving a request to provide content to a client device for presentation, the request identifying the selected context;

responsive to the online system being unable to identify a user associated with the client device associated with the request, retrieving the generated characteristics associated with the selected context; and including content items having at least a threshold number of targeting criteria satisfied by the generated characteristics associated with the selected contexts in one or more selection processes that select the content to provide to the client device.

2. The method of claim 1, wherein generating characteristics of users presented with one or more content items in the selected context from the obtained characteristics comprises: selecting characteristics common to least a threshold number of users presented with one or more content items in the selected context.

3. The method of claim 1, wherein generating characteristics of users presented with one or more content items in the selected context from the obtained characteristics comprises: selecting characteristics common to at least a threshold percentage of users to whom the one or more content items were presented in the selected context.

4. The method of claim 1, wherein characteristics of an identified user are selected from a group consisting of: connections between the identified user and other users of the online system, actions performed by the identified user, demographic information of the identified user, interests of the identified user, and any combination thereof.

5. The method of claim 1, wherein the selected context in which a content item is presented relative to other comprises information identifying content presented by an application that presented the content item prior to presentation of the content item.

6. The method of claim 5, wherein the selected context in which the content item is presented relative to other comprises information identifying content presented by an application that presented the content item in conjunction with the content item.

7. The method of claim 1, wherein the selected context in which a content item is presented relative to other content comprises one or more interactions by a user with the application a location within an application in which the content item was presented.

8. The method of claim 1, wherein the selected context in which a content item is presented relative to other content comprises one or more web pages presented prior to presentation of a web page in which the content item was presented.

9. The method of claim 8, wherein selected context in which the content item is presented relative to other content further comprises additional content presented by the web page in which the content item was presented.

10. The method of claim 8, wherein the selected context in which the content item is presented relative to other content item further identifies an application that presented the web page.

11. A computer program product comprising a non-transitory computer-readable storage medium having instructions encoded thereon that, when executed by a processor, cause the processor to:

maintain a plurality of content items at an online system for presentation to users of the online system;

maintain information at the online system describing contexts in which the content items are presented to users of the online system identified by the online system relative to other content presented to the users of the online system;

select a context in which one or more content items are presented relative to other content;

identify users of the online system to whom one or more content items were presented in the selected context relative to other content from the information maintained at the online system;

obtain characteristics of each of the identified users based information associated with the identified users by the online system;

generate characteristics of users presented with one or more content items in the selected context from the obtained characteristics;

store the generated characteristics in association with the selected context; receive a request to provide content to a client device for presentation, the request identifying the selected context;

responsive to the online system being unable to identify a user associated with the client device associated with the request, retrieve the generated characteristics associated with the selected context; and include content items having at least a threshold number of targeting criteria satisfied by the generated characteristics associated with the selected contexts in one or more selection processes that select the content to provide to the client device.

12. The computer program product of claim 11, wherein generate characteristics of users presented with one or more content items in the selected context from the obtained characteristics comprises: select characteristics common to least a threshold number of users presented with one or more content items in the selected context.

13. The computer program product of claim 11, wherein generate characteristics of users presented with one or more content items in the selected context from the obtained characteristics comprises: select characteristics common to at least a threshold percentage of users to whom the one or more content items were presented in the selected context.

14. The computer program product of claim 11, wherein the selected context in which a content item is presented relative to other comprises information identifying content presented by an application that presented the content item prior to presentation of the content item.

15. The computer program product of claim 14, wherein the selected context in which the content item is presented relative to other comprises information identifying content presented by an application that presented the content item in conjunction with the content item.

16. The computer program product of claim 11, wherein the selected context in which a content item is presented relative to other content comprises one or more interactions by a user with the application a location within an application in which the content item was presented.

17. The computer program product of claim 11, wherein the selected context in which a content item is presented relative to other content comprises one or more web pages presented prior to presentation of a web page in which the content item was presented.

18. The computer program product of claim 17, wherein selected context in which the content item is presented relative to other content further comprises additional content presented by the web page in which the content item was presented.

* * * * *

UNITED STATES PATENT AND TRADEMARK OFFICE
CERTIFICATE OF CORRECTION

PATENT NO. : 9,959,258 B2  
APPLICATION NO. : 15/136559  
DATED : May 1, 2018  
INVENTOR(S) : Junbiao Tang et al.

It is certified that error appears in the above-identified patent and that said Letters Patent is hereby corrected as shown below:

In the Claims

Column 18, Line 57-58, Claim 1 after "users based" insert -- on --.
Column 19, Line 13, Claim 2 after "common to" insert -- at --.
Column 19, Line 29, Claim 5 after "other" insert -- content --.
Column 19, Line 34-35, Claim 6 after "other" insert -- content --.
Column 19, Line 40-41, Claim 7 after "comprises" delete "one or more interactions by a user with the application".
Column 19, Line 53-54, Claim 10 after "other content" delete "item" and insert -- items --.
Column 20, Line 7-8, Claim 11 after "user based" insert -- on --.
Column 20, Line 31-32, Claim 12 after "common to" insert -- at --.
Column 20, Line 42, Claim 14 after "relative to other" insert -- content --.
Column 20, Line 47, Claim 15 after "relative to other" insert -- content --.
Column 20, Line 52-53, Claim 16 after "comprises" delete "one or more interactions by a user with the application".

Signed and Sealed this  
Thirtieth Day of October, 2018

Andrei Iancu  
*Director of the United States Patent and Trademark Office*